US 12,355,874 B2

(12) United States Patent
Relyea

(10) Patent No.: US 12,355,874 B2
(45) Date of Patent: Jul. 8, 2025

(54) STATEFUL HASH-BASED SIGNATURES USING A SECURE DEVICE

(71) Applicant: Red Hat, Inc., Raleigh, NC (US)

(72) Inventor: Robert J. Relyea, Sunnyvale, CA (US)

(73) Assignee: Red Hat, Inc., Raleigh, NC (US)

( * ) Notice: Subject to any disclaimer, the term of this patent is extended or adjusted under 35 U.S.C. 154(b) by 196 days.

(21) Appl. No.: 18/305,742

(22) Filed: Apr. 24, 2023

(65) Prior Publication Data
US 2024/0356736 A1 Oct. 24, 2024

(51) Int. Cl.
H04L 9/08 (2006.01)
H04L 9/32 (2006.01)

(52) U.S. Cl.
CPC .......... H04L 9/0877 (2013.01); H04L 9/0825 (2013.01); H04L 9/0869 (2013.01); H04L 9/3236 (2013.01); H04L 9/3247 (2013.01)

(58) Field of Classification Search
CPC ..................................................... H04L 9/0877
See application file for complete search history.

(56) References Cited

U.S. PATENT DOCUMENTS

| | | | |
|---|---|---|---|
| 10,230,525 B2 | 3/2019 | Campagna et al. | |
| 10,581,616 B1 | 3/2020 | Paruzel | |
| 11,405,213 B2 | 8/2022 | Ghosh et al. | |
| 2019/0319802 A1 | 10/2019 | Misoczki et al. | |
| 2020/0036534 A1* | 1/2020 | Atmopawiro | H04L 9/302 |
| 2021/0306155 A1* | 9/2021 | Sastry | H04L 9/3236 |
| 2022/0078024 A1* | 3/2022 | Misoczki | G06N 10/00 |
| 2022/0086009 A1* | 3/2022 | Vacek | H04L 9/0877 |
| 2023/0065643 A1 | 3/2023 | Vargas et al. | |

OTHER PUBLICATIONS

Campos et al., "LMS vs XMSS: Comparison of Stateful Hash-Based Signature Schemes on ARM Cortex-14," Progress in Cryptology—Africacrypt 2020, Jul. 5, 2020: pp. 258-277.
Hülsing et al., "Forward Secure Signatures on Smart Cards Full Version," SAC: International Conference on Selected Areas in Cryptography, Lecture Notes on Computer Science, vol. 7707, Aug. 2012: pp. 1-19.

* cited by examiner

Primary Examiner — Bradley W Holder
(74) Attorney, Agent, or Firm — Kilpatrick Townsend & Stockton LLP

(57) ABSTRACT

Stateful hash-based signatures can be implemented using a secure device. For example, a computing device can transmit a request to a secure device to obtain a partial digital signature usable to cryptographically sign data, where the secure device is separate from the computing device. The secure device can generate the partial digital signature using a private key, which is generated by the secure device based on a counter value. The counter value is maintained internally to the secure device. The computing device can then receive, from the secure device, the partial digital signature and the counter value corresponding to the private key. The computing device can construct a full digital signature, to cryptographically sign the data, based on the partial digital signature and the counter value.

20 Claims, 6 Drawing Sheets

STATEFUL HASH-BASED SIGNATURES USING A SECURE DEVICE

TECHNICAL FIELD

The present disclosure relates generally to cryptography. More specifically, but not by way of limitation, this disclosure relates to using a secure device to implement stateful hash-based signatures.

BACKGROUND

Quantum computing presents risks to existing cryptographic signing algorithms. So, new signing algorithms have been developed to help mitigate this risk. One such signing algorithm is called a stateful hash-based algorithm. Examples of stateful hash-based algorithms include the extended Merkle Signature Scheme (XMSS) and Leighton-Micali Signatures (LMS). Stateful hash-based algorithms combine one-time keys with a Merkle tree. These hash-based algorithms are considered "stateful" because they have a persistent state. The persistent state helps ensure that any one-time keys that have already been used to sign something are never reused, which would compromise the security of the system.

DETAILED DESCRIPTION

Figure 1:
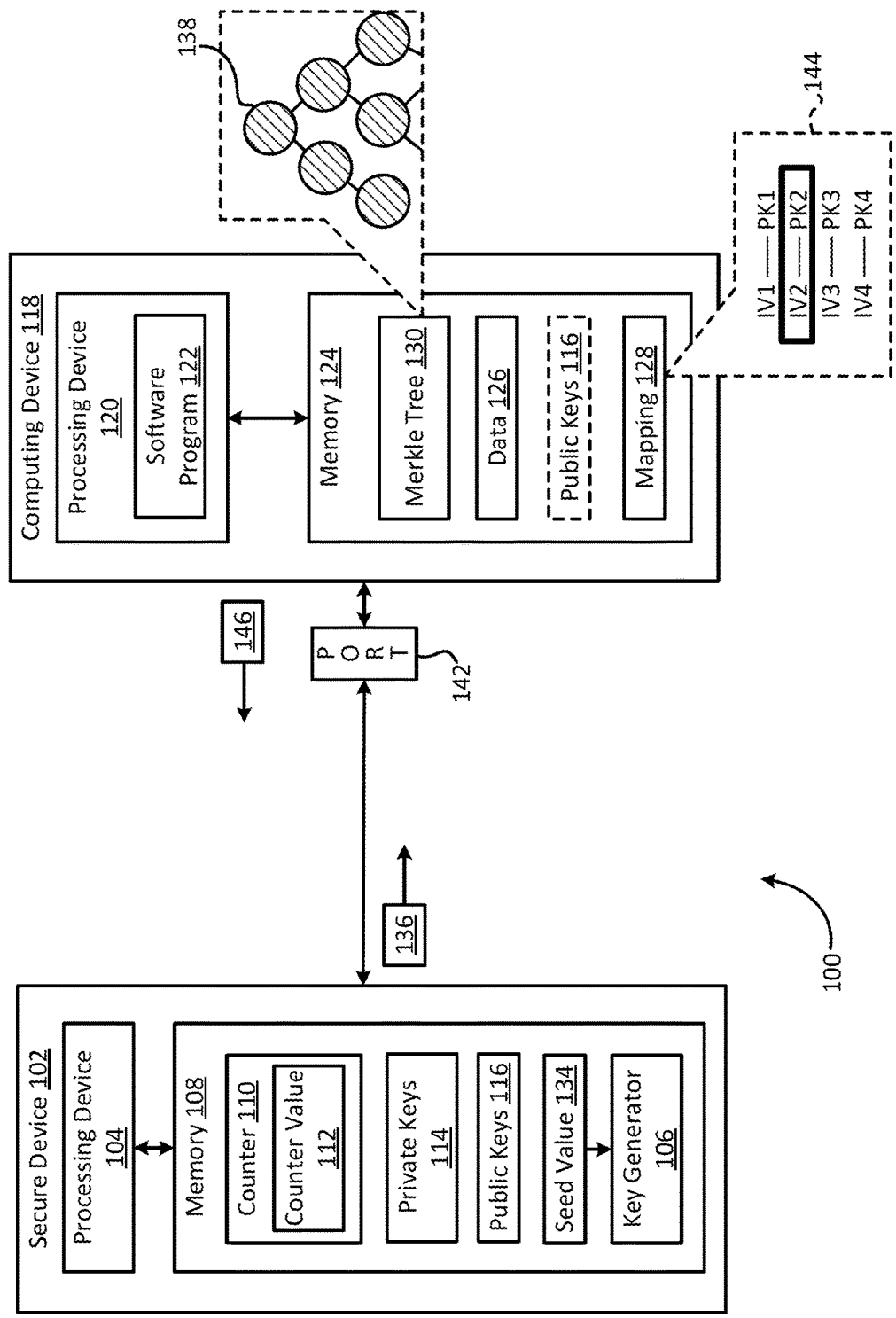
FIG. 1 shows a block diagram of an example of a system for implementing stateful hash-based signatures using a secure device according to some aspects of the present disclosure.

Stateful hash-based algorithms are cryptographic algorithms that have recently been developed to help overcome certain cryptographic risks associated with quantum computing, among other reasons. These hash-based algorithms have a persistent state that helps ensure that any one-time keys that have already been used to cryptographically sign something are never reused. Maintaining this state is critical to the security of these algorithms. If the state is lost or compromised, the same one-time key may be used more than once, which can undermine the security of the algorithm. But under normal circumstances, the algorithm's state may be lost or compromised for a variety of reasons. For example, a virtual machine or container may be executing the stateful hash-based algorithm. If the virtual machine or container gets cloned, which happens fairly frequently in the context of cloud computing, it would result in multiple independent copies of the algorithm's state that may diverge over time. This divergence could result in the same one-time key being used multiple times to sign multiple objects, jeopardizing security. As another example, a software program executing the stateful hash-based algorithm may be automatically backed up one or more times to disk, which would result in multiple independent copies of the algorithm's state that may diverge over time. If a system (e.g., the same system or a different system) is then restored using a backup, the outdated state would be deployed in the system. This can lead to another scenario where the same one-time key is used multiple times. Thus, there are risks associated with running these stateful hash-based algorithms using normal software in a typical computing environment.

Some examples of the present disclosure can overcome one or more of the abovementioned problems by using a secure device to track the state of a stateful hash-based algorithm. The secure device can be any hardware device that has its own secure memory and its own secure processing device. Secure memory can be memory that cannot be accessed outside the secure device. A secure processing device can be a processor that is configured to execute trusted (e.g., immutable and verified) software. For example, the secure device can be a smartcard or a trusted platform module, both of which have their own internal memory and processing devices that may be configured with enhanced security. The secure device can be connected to a computing device, which can have its own processing device (e.g., CPU) and memory that are separate from that of the secure device. The computing device can execute a software program that can cooperate with the secure device to implement a stateful hash-based algorithm. For example, the secure device can maintain the state of the stateful hash-based algorithm and cryptographically sign objects at the request of the software program. And the software program can generate a Merkle tree and use the Merkle tree to validate the signed objects. Secure physical hardware can protect internal data from cloning by only accessing the data from controlled trusted programs, so by maintaining the algorithm's state on the secure device, the risks associated with duplicate copies of the algorithm's state may be avoided. And since some types of secure devices (e.g., smartcards) are relatively cheap and still have the capability to perform the required cryptographic operations like hashing, by dividing up the signing process as described above, secure devices may serve as a viable alternative to using generic computers and more-specialized cryptographic hardware to perform the state tracking, both of which are normally more expensive.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a system 100 for implementing stateful hash-based signatures using a secure device 102 according to some aspects of the present disclosure. As shown, the system 100 includes a secure device 102 that can communicate with a computing device 118 to implement a stateful hash-based signature process.

The secure device 102 includes a processing device 104 and a memory 108. The processing device 104 can be a secure processing device and the memory 108 can be a secure memory, which is inaccessible to the computing device 118. Examples of the processing device 104 can include a Field-Programmable Gate Array (FPGA), an application-specific integrated circuit (ASIC), and a microprocessor. Examples of the memory 108 can include magnetic disks, memory chips, ROM, random access memory (RAM), and optical storage.

The computing device 118 can also include a processing device 120 and a memory 124. Examples of the processing device 104 can include a FPGA, an ASIC, and a microprocessor. Examples of the memory 108 can include magnetic disks, memory chips, ROM, RAM, and optical storage. The computing device 118 may be of any suitable type, such as a laptop computer, desktop computer, server, mobile phone, wearable device (e.g., a smart watch), tablet, or e-reader.

The secure device 102 can communicate with a computing device 118 in any suitable manner. For example, the secure device 102 may be a smartcard, smart key fob, or other handheld device. Such handheld devices can be physically attached to (and removed from) the computing device 118 to allow the two devices to communicate with one another. For instance, a user may plug the secure device 102 into a port 142 (e.g., an internal port or an external hub) of the computing device 118 to allow the two devices to communicate with each other. In other examples, the secure device 102 can wirelessly communicate with the computing device 118. To do so, the secure device 102 may include any suitable hardware for establishing a wireless connection, such as a Bluetooth chip or a network card. In still other examples, the secure device 102 may be a trusted platform module or the like, which may be physically affixed to an internal component (e.g., the motherboard) of the computing device 118. Thus, the secure device 102 may not necessarily be separate from the computing device 118, though it is shown that way in FIG. 1 for simplicity.

Figure 2:
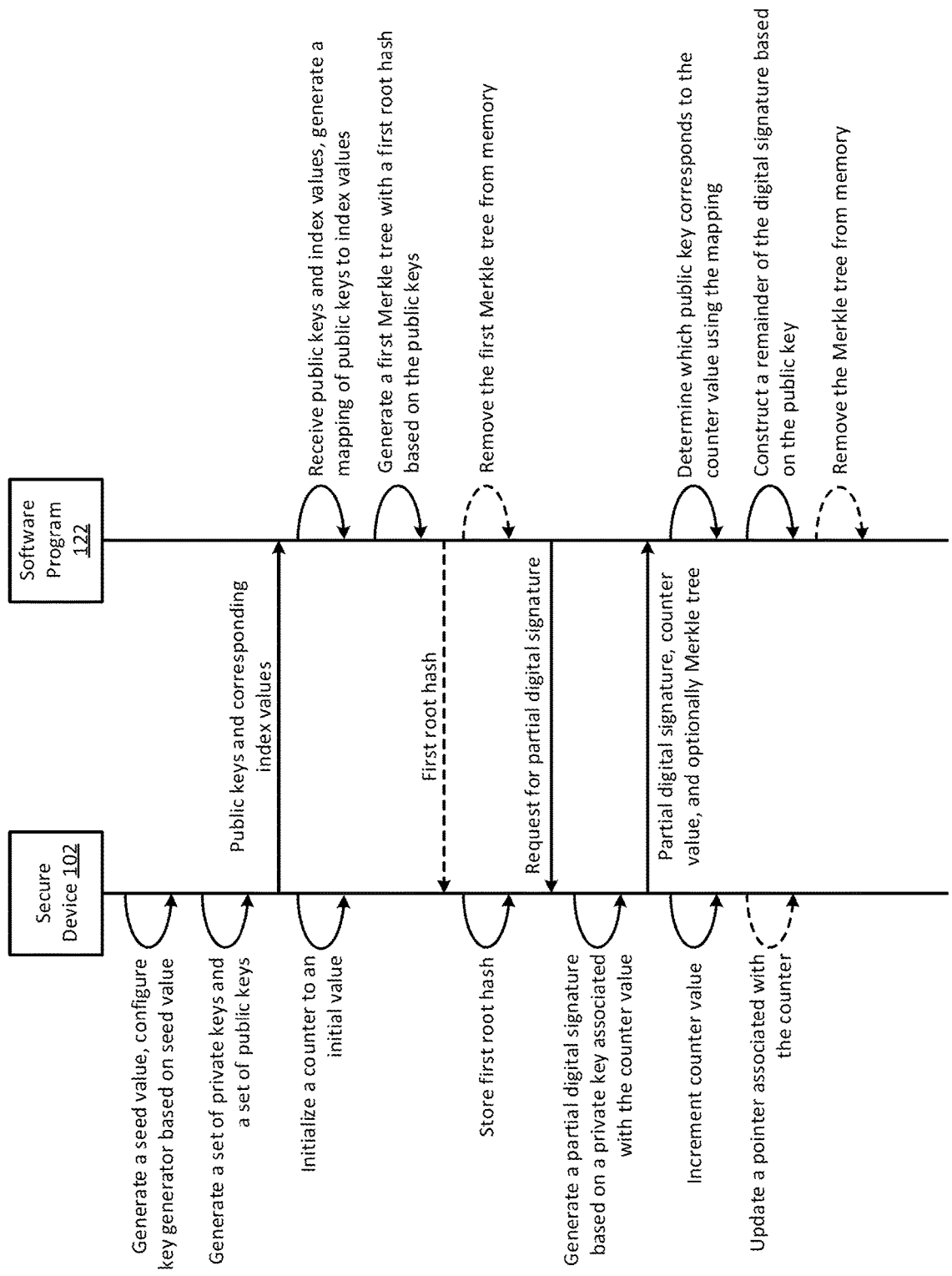
FIG. 2 shows a sequence diagram of an example of a process for implementing stateful hash-based signatures using a secure device according to some aspects of the present disclosure.

Once connected (e.g., physically or wirelessly), the secure device 102 and the computing device 118 can cooperate to implement a stateful hash-based signature process. An example of the stateful hash-based signature process is shown in FIG. 2. The steps of FIG. 2 will now be described with reference to the components of FIG. 1.

The process can begin with the secure device 102 generating a seed value 134. The secure device 102 can then configure a key generator 106 based on the seed value 134. An example of the key generator 106 can be a pseudorandom function (PRF). Using the key generator 106, the secure device 102 can generate a set of private keys 114 by index (e.g., based on index values). The index values can be inputs to the key generator 106 when generating the private keys 114. The secure device 102 can also generate a set of public keys 116 based on the private keys 114. The private keys 114 and the public keys 116 can be asymmetric key pairs, in which each public key is correlated to a private key. Since the secure device 102 generates the private keys 114 based on corresponding index values and the seed value, each asymmetric key pair (e.g., public-private key pair) can correspond to a single index value. For instance, a first private key and a first public key can correspond to a first index value, a second private key and a second public key can correspond to a second index value, and so on. In some contexts, the public keys and private keys may be referred to as "OTS public keys and "OTS private keys," respectively, where OTS refers to "one-time signature".

After generating some or all of the public keys 116, the secure device 102 can transmit the public keys 116 and their corresponding index values to a software program 122 executing on the computing device 118. The software program 122 may be a microservice, application, serverless function, or any other type of software. In contrast to the public keys 116, the private keys 114 are maintained internal to the secure device 102 and hidden from the computing device 118.

Depending on the capabilities of the secure device 102, in some examples the secure device 102 may iteratively generate each asymmetric key pair one-by-one. For example, the secure device 102 can generate an asymmetric key pair based on the current index value and the seed value, transmit the public key and the current index value to the software program 122, delete the asymmetric key pair from the memory 108, and update the index value. In some examples, the secure device 102 can automatically repeat this process until a stopping condition is satisfied. One example of the stopping condition may be that a predefined number of asymmetric key pairs have been generated. Alternatively, the secure device 102 can execute the above process each time that it receives a public-key request from the software program 122, so that the process is repeatedly triggered by the software program 122 depending on how many public keys it wants. Since generating asymmetric key pairs one-by-one conserves memory (e.g., because no more than a single asymmetric key pair is present on the secure device 102 at any given point in time), this approach may be better suited to secure devices that have small amounts of memory, like smartcards.

The secure device 102 can also initialize a counter 110 to an initial value. The counter 110 can maintain the state of the stateful hash-based algorithm. As will be described later on, the counter 110 can be incremented each time the secure device 102 generates a digital signature. This can help ensure that the same private key is not used more than once. The counter 110 can be initialized at any point before the first signature is generated.

The software program 122 can receive the public keys 116 and their corresponding index values. The software program 122 can then generate a mapping 128 of the public keys 116 to their corresponding index values. One example of the mapping 128 is shown in box 144 of FIG. 1, in which the index values ("IV") are correlated to their related public keys 116 ("PK"). The software program 122 can then generate a Merkle tree 130 based on the public keys 116. The Merkle tree 130 can have a root hash 138 that is determined by hashing the public keys 116. Thus, in some contexts the root hash can also be referred to as an "overall public key." Since the creation of the Merkle tree 130 can be resource intensive, performing this process on the computing device 118 (rather than on the secure device 102) can allow for lower-resource devices to be used as the secure device 102.

In some examples, the software program 122 can transmit the root hash 138 to the secure device 102 for storage thereon. The software program 122 may then remove the root hash 138, and optionally the Merkle tree 130, from memory 124 to conserve space. In addition to conserving space, providing the root hash 138 to the secure device 102 allows for portability of the root hash 138 with the secure device 102. As a result, if the secure device 102 is connected to another computer device that does not have a copy of the root hash 138, the secure device 102 can provide the root hash 138 to the computing device to allow the computing device to implement this stateful hash-based signature process. Providing the Merkle tree (or a compressed version thereof) to the secure device 102 can also provide similar benefits, for example because the secure device 102 can provide the Merkle tree to another computing device that may not already have a copy of the Merkle tree.

At a later point in time, the software program 122 can transmit a request 146 to the secure device 102 for a partial digital signature for use in signing data 126. The secure device 102 can receive the request 146, determine the current counter value 112, and generate the partial digital signature based on a private key 114 associated with the current counter value 112. For example, the secure device 102 can receive the request 146 and, in response to receiving the request 146, determine the current counter value 112. Based on the current counter value 112, the secure device 102 can determine the corresponding private key 114. For example, the secure device 102 can use the current counter value 112 as an index value for the key generator 106 to re-generate the appropriate private key 114. The secure device 102 can then generate the partial digital signature using the generated private key 114. This partial digital signature may be a one-time signature, such as a Winternitz one-time signature (WOTS) or a Lamport signature. The partial digital signature may be a component of a full stateful hash-based signature, such as an LMS or XMSS signature.

After generating the partial digital signature, the secure device 102 can transmit a response 136 to the computing device 118. The response 136 can include the partial digital signature and the current counter value 112. The response 136 may also include the root hash 138 (e.g., if the computing device 118 previously removed the root hash 138 from memory). The secure device 102 can determine whether to include the root hash 138 in the response 136 based on a flag in the request 146. If the flag is set, the secure device 102 can return the root hash 138 as part of the response 136. Otherwise, the secure device 102 may not provide the root hash 138 as part of the response 136.

After generating the partial digital signature, the secure device 102 can also increment the counter value 112. That way, the next time the computing device 118 requests that the secure device 102 provide a partial digital signature, the private key used in the signing process will be different from the private key used in the current iteration.

The software program 122 can receive the response 136 and extract the counter value 112 from the response 136. By using the counter value 112 as an index value in the mapping 128, the software program 122 can determine which public key 116 corresponds to the counter value 112. The software program 122 can then generate a remainder of the digital signature based on that public key 116. For example, the software program 122 can determine which node in the Merkle tree corresponds to the public key 116. That node can be referred to as the starting node. The software program 122 can then determine an adjacent node in the Merkle tree, where the adjacent node is any node that is adjacent to the starting node. That adjacent node will have a corresponding public key, which can be referred to as an adjacent public key. The software program 122 can determine a hash of the adjacent public key and add the hash to the partial digital signature, to thereby create an expanded digital signature. This process can repeat for the next adjacent node and continue up the Merkle tree, expanding the digital signature along the way, until the top of the Merkle tree (e.g., the root node) is reached. This chain of nodes, from the starting node to the top of the Merkle tree, can be referred to as the Merkle path. At the conclusion of this process, the expanded digital signature can be the full stateful hash-based signature.

In the above process, the secure device 102 primarily performs the steps of generating the asymmetric key pairs, maintaining the state (e.g., counter value 112) of the algorithm, and generating the partial digital signature. The software program 122, on the other hand, primarily performs the steps of generating the Merkle tree 130 and using that Merkle tree 130 to construct a remainder of the digital signature. This division of operations can help enhance the security of the system by reducing the ability of the algorithm's state to be copied, while also allowing for a wider variety of devices to be used as the secure device 102 by offloading the resource-intensive operations to the computing device 118.

In some examples, the secure device 102 can automatically rotate memory locations associated with the counter 110. For example, smartcards often have non-volatile memory that has a large, but finite number of write cycles. Each time the counter 110 is updated to sign data, a write cycle is performed in the corresponding memory location. To prevent premature failure of the memory 108, the secure device 102 can store the counter 110 as a pointer to a memory location. After the counter 110 reaches a predetermined value (e.g., which is less than the total number of write cycles expected for the memory location), the secure device 102 can automatically allocate a new memory location for the counter 110 and update the pointer to point to the new memory location. This can extend the life of the memory 108. For example, this may increase the number of writes to the counter by $n^2$. Using more levels of indirection can increase the number of writes even farther. For example, using two levels of indirection (e.g., pointer to a pointer to the counter 110) can increase the number of writes by $n^3$. Implementations can optimize the number of keys versus number of writes before failure, to allow the counter 110 to work for all the keys on the secure device 102.

Figure 3:
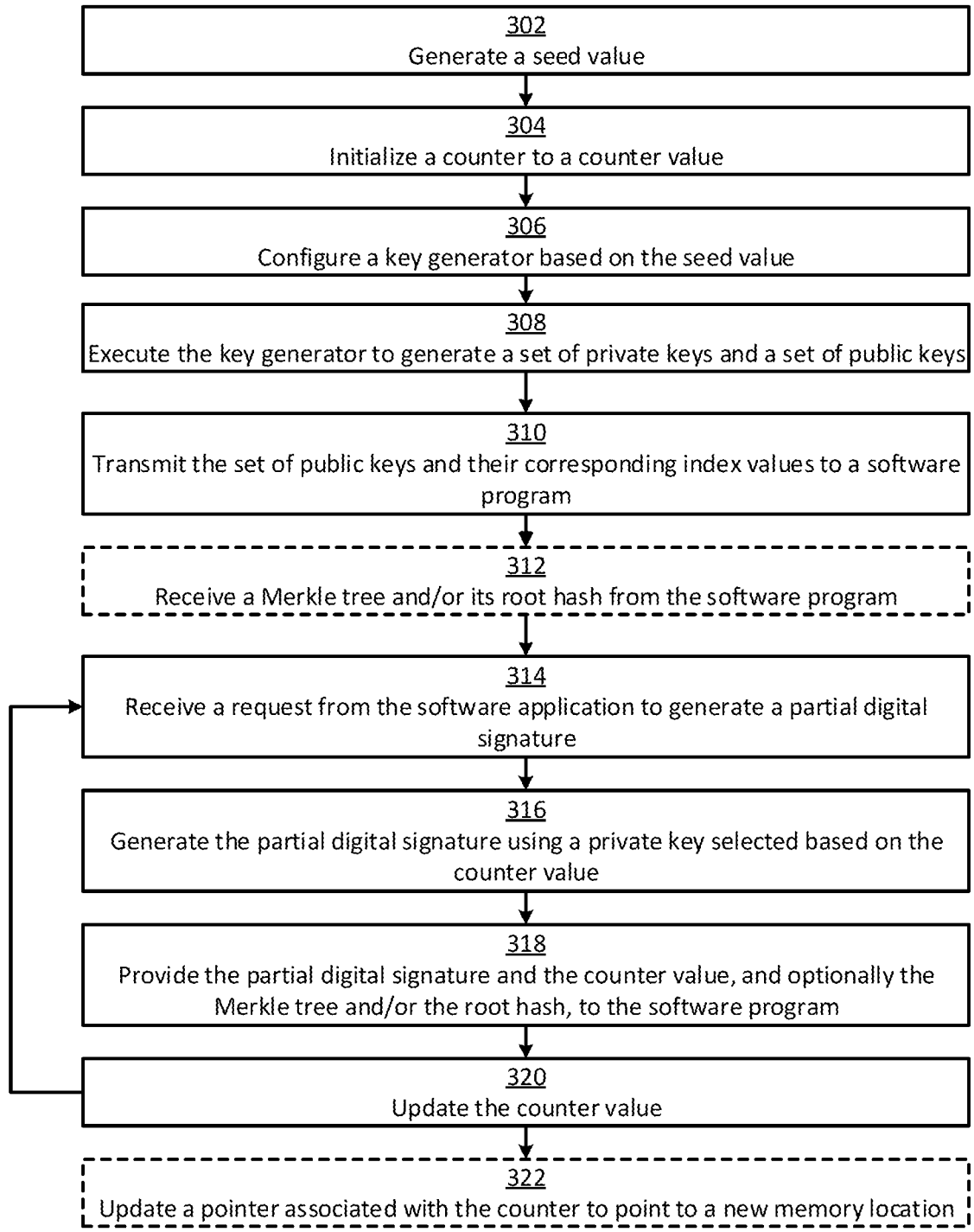
FIG. 3 shows a flowchart of an example of a process implemented by a secure device according to some aspects of the present disclosure.

FIG. 3 shows a flowchart of an example of a process implemented by a secure device 102 according to some aspects of the present disclosure. Other examples may include more operations, fewer operations, different operations, or a different sequence of operations than is shown in FIG. 3. The operations of FIG. 3 are described below with reference to the components of FIG. 1.

In block 302, the processing device 104 of the secure device 102 generates a seed value 134. The processing device 104 may generate the seed value 134 using a random number generator or a pseudorandom number generator. This seed value 134 is security sensitive and should remain hidden (e.g., should not be cloned, guessed, or divulged outside of the security device 102).

In block 304, the processing device 104 initializes a counter 110 to an initial value, such as zero.

In block 306, the processing device 104 configures a key generator 106 based on the seed value 134. This may involve setting a parameter of the key generator 106 to the seed value 134.

In block 308, the processing device 104 executes the key generator 106 to create a set of private keys 114 and a set of public keys 116, where the public keys 116 correspond to the private keys 114. The key generator 106 may determine each private key based on the seed value 134 and an index value, and each public key may be determined based on the corresponding private key. In some examples, the processing device 104 may generate each asymmetric key pair (e.g., private key and public key) one-by-one in response to individual requests from a software program 122, so that only one asymmetric key pair is present on the secure device 102 at any given point in time.

In block 310, the processing device 104 transmits the set of public keys 116 and their corresponding index values (e.g., individually or as a batch) to the a software program 122 executing on a computing device 118. The processing device 104 can transmit the set of public keys 116 over a wired or wireless connection with the computing device 118. The public keys 116 may be transmitted individually or as a batch to the software program 122, depending on the implementation. For instance, in some examples in which the asymmetric key pairs are generated one-by-one in response to individual requests from the secure device 102, the processing device 104 may transmit each public key one-by-one to the software program 122.

In block 312, the processing device 104 optionally receives and stores a Merkle tree and/or its root hash from the software program 122. Receiving and storing the Merkle tree may involve receiving and storing the full Merkle tree or just a part of the Merkle tree (a partial Merkle tree). An example of the Merkle tree may be the Merkle tree 130, and an example of the root hash may be the root hash 138, both of which are described above. The processing device 104 can receive the Merkle tree or the root hash over a wired or wireless connection with the computing device 118.

In block 314, the processing device 104 receives a request 146 from the software program 122 to generate a partial digital signature for use in signing data 126. The request 146 can include the data 126 to be signed.

In block 316, the processing device 104 generates the partial digital signature based on the counter value 112. For example, the processing device 104 can re-generate one of the private keys 114 based on seed value 134 and the current counter value 112. This may be achieved by configuring the key generator 106 with the seed value 134 and then using the current counter value 112 as an index value for the key generator 106. After re-generating the private key, the processing device 104 can generate the partial digital signature using the private key.

In block 318, the processing device 104 provides the partial digital signature and the counter value 112, and optionally the Merkle tree and the root hash, to the software program 122. In some examples, the processing device 104 may always provide the Merkle tree and/or root hash to the software program 122 by default (assuming it previously received one or both of them from the software program 122). In other examples, the processing device 104 may only provide the Merkle tree and/or the root hash to the software program 122 when a special flag is received as part of the request 146 from the software program 122.

In block 320, the processing device 104 updates the counter value 112. For example, the processing device 104 can increment the counter value 112 by one or by another amount.

If the processing device 104 receives another request from the software program 122 to generate a partial digital signature, the process can return to block 314 and repeat. Operations 314-320 can repeat each time the processing device 104 receives a new signature request from the software program 122.

In block 322, the processing device 104 optionally updates a pointer associated with the counter 110 to point to a new memory location. The processing device 104 can automatically update the pointer in response to any suitable triggering event, for example in response to determining that the current counter value 112 meets or exceeds a predetermined threshold value. This may help prevent the memory 108 from failing prematurely.

Figure 4:
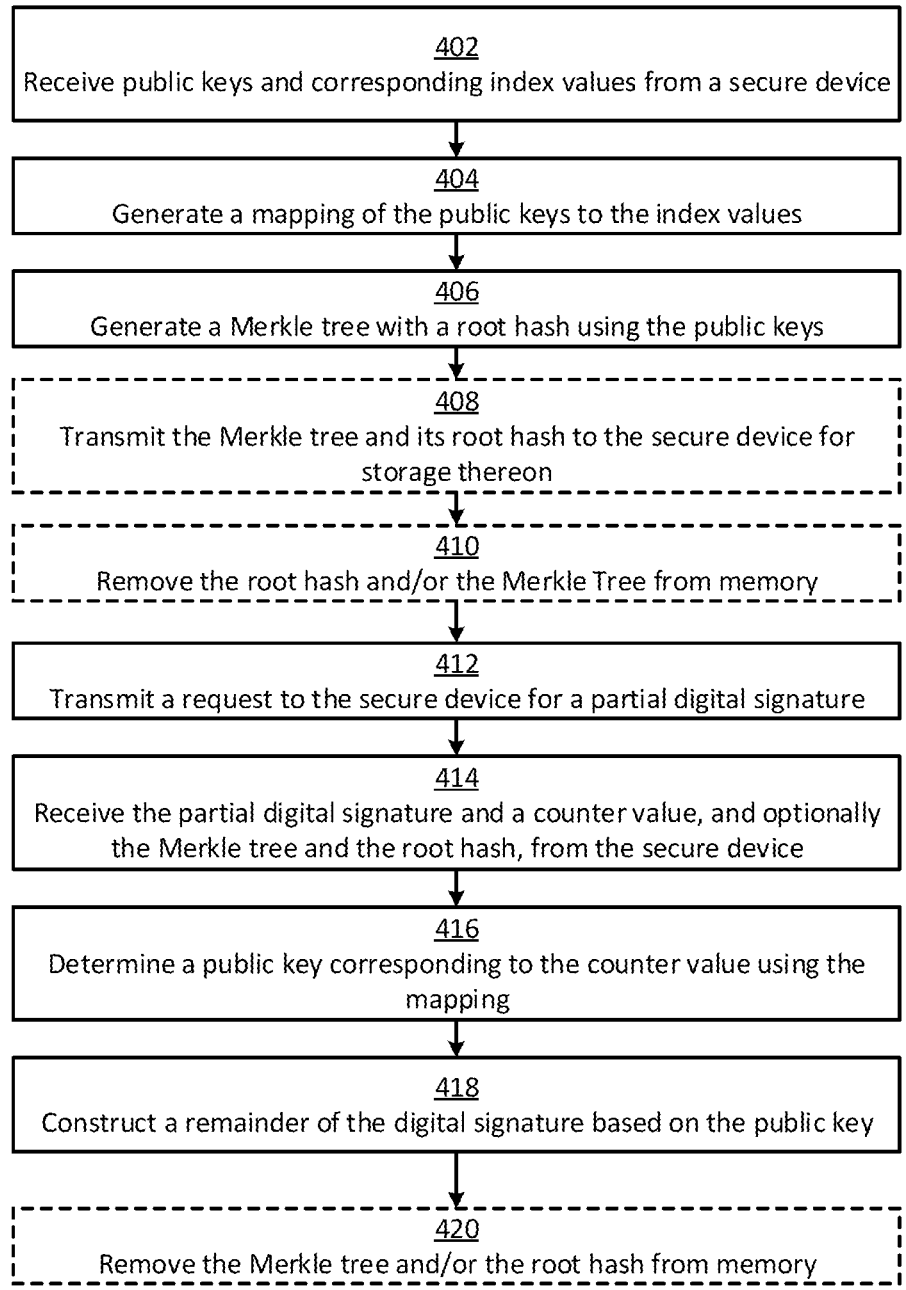
FIG. 4 shows a flowchart of an example of a process implemented by a computing device according to some aspects of the present disclosure.

FIG. 4 shows a flowchart of an example of a process implemented by a computing device 118 according to some aspects of the present disclosure. Other examples may include more operations, fewer operations, different operations, or a different sequence of operations than is shown in FIG. 4. The operations of FIG. 4 are described below with reference to the components of FIG. 1. Some or all of the following operations may be performed by the software program 122 executing on the processing device 120.

In block 402, a processing device 120 of a computing device 118 receives a set of public keys 116 and corresponding index values from a secure device 102. The processing device 120 can receive the set of public keys 116 over a wired or wireless connection with the secure device 102. In some examples, the processing device 120 can receive the set of public keys and corresponding index values one-by-one, in response to an individual request for each public key.

In block 404, the processing device 120 generates a mapping 128 of the public keys 116 to their index values. The mapping 128 can include relationships between the public keys and the index values. In the mapping 128, each public key can be correlated to its corresponding index value.

In block 406, the processing device 120 generates a Merkle tree 130 using the public keys 116. The Merkle tree 130 can have a root hash 138.

In block 408, the processing device 120 optionally transmits the Merkle tree 130 and its root hash 138 to the secure device 102 for storage thereon.

In block 410, the processing device 120 optionally removes the root hash 138 and/or the Merkle tree 130 from memory 124.

In block 412, the processing device 120 transmits a request 146 to the secure device 102 for a partial digital signature for use in signing data 126. In some examples, the request 146 may include the data 126 (e.g., in its normal format or a hashed format). The data 126 may include application data, video data, audio data, image data, text data, an electronic document, a certificate, and/or any other type of data. In some examples, the processing device 120 can set a flag in the request 146 to receive a copy of the Merkle tree 130 and/or the root hash 138 back from the secure device 102.

In block 414, the processing device 120 receives the partial digital signature and a counter value 112, and optionally the Merkle tree 130 and/or the root hash 138, from the secure device 102.

In block 416, the processing device 120 determines a public key corresponding to the counter value 112 using the mapping 128. For example, the processing device 120 can use the counter value 112 as one of the index values in the mapping 128 and, based thereon, determine the corresponding public key in the mapping 128. In the example shown in FIG. 1, the processing device 120 has determined that the second public key ("PK2") corresponds to the counter value 112 ("IV2") in the mapping 128, as represented by the bold box.

In block 418, the processing device 120 constructs a remainder of the digital signature based on the determined public key. For example, the processing device 120 can determine which node in the Merkle tree corresponds to the public key 116. That can be the starting node. The processing device 120 can then determine an adjacent node, determine the adjacent node's public key, hash that public key, and add that hash to the partial digital signature, to thereby create an expanded digital signature. The processing device 120 can repeat this process the next adjacent node and continue up the Merkle tree, expanding the digital signature along the way, until the root node of the Merkle tree is reached. At the end of this process, the expanded digital signature will be the full digital signature used to sign the data 126.

In block 420, the processing device 120 optionally removes the Merkle tree 130 and/or the root hash 138 from memory 124 again (e.g., if it received the Merkle tree 130 and the root hash 138 as part of the response 136 from the secure device 102).

Figure 5:
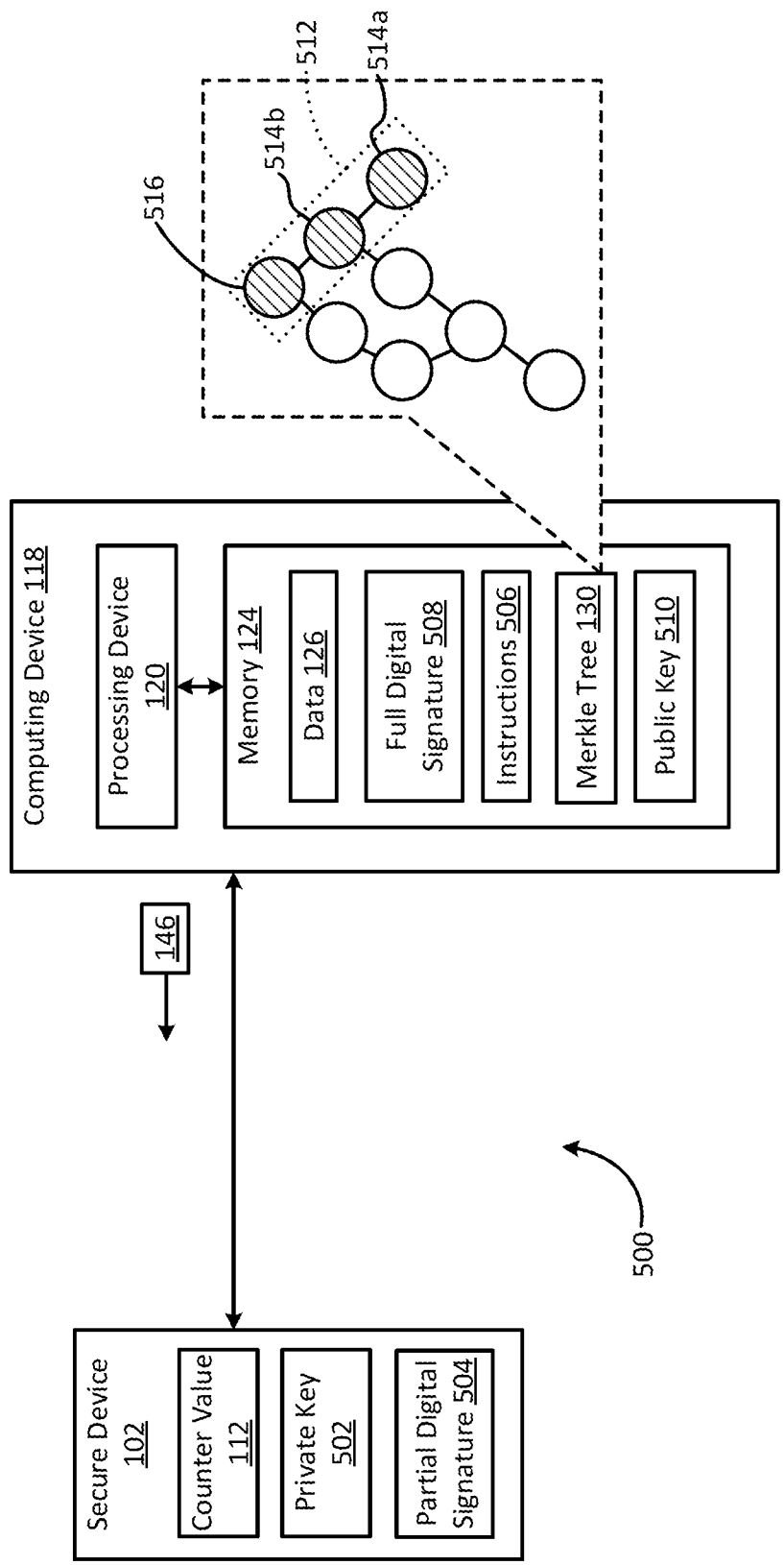
FIG. 5 shows a block diagram of an example of a system for implementing stateful hash-based signatures using a secure device according to some aspects of the present disclosure.

FIG. 5 shows a block diagram of an example of a system 500 for implementing stateful hash-based signatures using a secure device 102 according to some aspects of the present disclosure. The system 500 includes a computing device 118 in communication with the secure device 102.

As noted above, the computing device 118 includes a processing device 120 coupled to memory 124. In some examples, the processing device 120 may be a central processing unit (CPU). The processing device 120 is hardware that can include one processor or multiple processors. The processing device 120 can execute instructions 506 stored in the memory 124 to perform one or more operations. In some examples, the instructions 506 can include processor-specific instructions generated by a compiler or an interpreter from code written in any suitable computer-programming language, such as C, C++, C#, and Java. In some examples, the instructions 506 may correspond to the software program 122 of FIG. 1.

The memory 124 can include one memory device or multiple memory devices. The memory 124 can be volatile or non-volatile (i.e., the memory 124 can retain stored information when powered off). Examples of the memory 124 include electrically erasable and programmable read-only memory (EEPROM), flash memory, or any other type of non-volatile memory. At least a portion of the memory device includes a non-transitory computer-readable medium. A computer-readable medium can include electronic, optical, magnetic, or other storage devices capable of providing the processing device 120 with the instructions 506 or other program code. Examples of a computer-readable medium include magnetic disks, memory chips, ROM, RAM, an ASIC, a configured processor, optical storage, or any other medium from which a computer processor can read the instructions 506.

The processing device 120 can execute the instructions 506 to perform operations. For example, the processing device 120 can transmit a request 146 to the secure device 102. The request 146 can be for obtaining a partial digital signature 504 usable to cryptographically sign data 126. The secure device 102 is separate from the processing device 120 and configured to generate the partial digital signature 504 using a private key 502. The private key 502 can be generated by the secure device 102 based on a counter value 112 maintained internally to the secure device 102. Based on the request 146, the secure device 102 can generate the partial digital signature 504 and provide it to the processing device 120. The processing device 120 can receive, from the secure device 102, the partial digital signature 504 and the counter value 112 corresponding to the private key 502. The processing device 120 can then construct the full digital signature 508, for use in signing the data 126, based on the partial digital signature 504 and the counter value 112. For example, the processing device 120 can use the counter value 112 to determine a public key 510 that corresponds to the private key 502. The processing device 120 can then determine a Merkle path 512 through a Merkle tree 130, where the Merkle path 612 extends from a starting node 514a associated with the public key 510 to a root node 516 of the Merkle tree 130. The processing device 120 can expand the partial digital signature 504 into the full digital signature 508 by hashing additional public keys 514a-b along the Merkle path 512. The processing device 120 can cryptographically sign the data 126 using the full digital signature 508.

Figure 6:
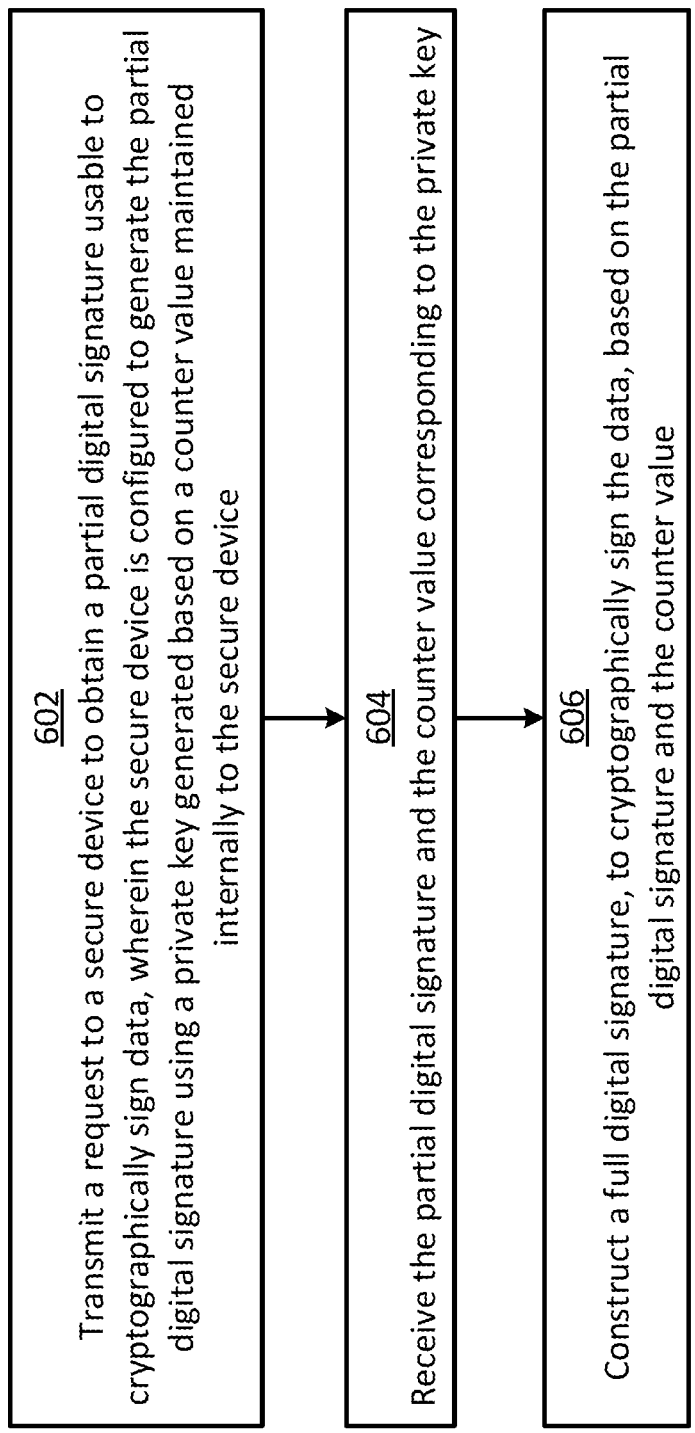
FIG. 6 shows a flowchart of an example of a process for implementing stateful hash-based signatures using a secure device according to some aspects of the present disclosure.

FIG. 6 shows a flowchart of an example of a process for implementing stateful hash-based signatures using a secure device according to some aspects of the present disclosure. Other examples may include more operations, fewer operations, different operations, or a different sequence of operations than is shown in FIG. 6. The operations of FIG. 6 are described below with reference to the components of FIGS. 1 and 5. Some or all of the following operations may be performed by a software program 122 executing on the processing device 120.

In block 602, the processing device 120 transmits a request 146 to a secure device 102 to obtain a partial digital signature 504 usable to cryptographically sign data. The secure device 102 is separate from the processing device 120. The secure device 102 can be configured to generate the partial digital signature 504 using a private key 502. The private key 502 can be generated by the secure device 102 based on a counter value 112 maintained internally to the secure device 102.

In block 604, the processing device 120 receives, from the secure device 102, the partial digital signature 504 and the counter value 112 corresponding to the private key 502.

In block 606, the processing device 120 constructs a full digital signature 508 (e.g., for use in cryptographically signing the data 126) based on the partial digital signature 504 and the counter value 112. For example, the processing device 120 can use the counter value 112 to determine a public key 510 that corresponds to the private key 502. The processing device 120 can then determine a Merkle path 512 through a Merkle tree 130, where the Merkle path 612 extends from a starting node 514a associated with the public key 510 to a root node 516 of the Merkle tree 130. Based on the Merkle path 512, the processing device 120 can expand the partial digital signature 504 into the full digital signature 508 by hashing additional public keys 514a-b along the Merkle path 512 and adding their hashed values to the partial digital signature 504.

Some examples may also involve more sophisticated stateful hash-based algorithms that use multi-level Merkle trees, where the top level Merkle tree can sign the next level Merkle tree. To implement these more sophisticated algorithms, the processing device 120 can obtain a signature for each of the current Merkle trees. One way to do this is to allow the processing device 120 to determine the current Merkle trees (e.g., based on the public keys for those Merkle trees generated by the secure device 102), and then request that the secure device 102 sign the top-level Merkle tree. The secure device 102 can sign the top-level Merkle tree using a private key and store the resulting signature in its memory 108.

In the above scenario, the base digital signature comes from the bottom most Merkel tree. The processing device 120 requests all of the public keys for the top-level Merkel tree and calculates the root hash for that top-level tree. That root hash can be stored in the secure device 102. The processing device 120 then requests all of the public keys for the current next level Merkle tree and creates the root hash for that tree. The processing device 120 then asks the security device 102 to 'tree sign' this root hash from the appropriate private key in the top-level hash. This private key should match the current index in the top-level hash for that private key. If it does not match, the secure device 102 can generate an error. The root hash for the current level and the resulting signature are stored. If the root hash for this level has already been set, the root hash must match the one supplied. This technique is safe because no matter when or where the processing device 120 calculates the next-level Merkle tree, it should always get the same Merkle tree because it is generated by the same key generator 106 (e.g., pseudorandom function). This key generator 106 can reuse the single seed value used in the main Merkle tree with an additional address for the level and tree number, or it could generate a new fresh unique seed for each Merkle tree. Only the currently active trees may have stored seeds. Once a Merkle tree has been exhausted, the specific seed for that Merkle tree can be cleared, as well as the root hash for that Merkle tree (and the index on the parent tree incremented). This can allow for a new Merkle tree to be generated and a new root hash to be signed.

A second way to handle multi-trees is to have each Merkle tree stored on a separate secure device. Lower-level secure devices may store the root hashes, Merkle paths, and signatures for the Merkle trees before it, as well as the signature for its own root hash. To create digital signatures, only the bottom-most secure device is needed. Once that secure device exhausts its private keys, it can be discarded and new secure device can be initialized and its root hash signed with the secure device for the next level up. This allows the secure devices to function as a key backup system. The top-level secure device can sign several backup devices, which can be locked away. The backup devices can be deployed if the primary secure device exhausts its keys or is lost. In all these cases, keys are never reused because our backup secure devices can partition the overall key space into separate key spaces that do not overlap.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A method comprising:
   transmitting, by a processing device, a request to a secure device to obtain a partial digital signature for cryptographically signing data, wherein the secure device is separate from the processing device and configured to generate the partial digital signature using a private key, the private key being generated by the secure device based on a counter value that is maintained internally to the secure device, wherein the secure device includes a hardware processor;
   receiving, by the processing device and from the secure device, the partial digital signature associated with the request;
   receiving, by the processing device and from the secure device, the counter value corresponding to the private key; and
   constructing, by the processing device, a full digital signature, to cryptographically sign the data, based on the partial digital signature and the counter value.

2. The method of claim 1, wherein the secure device is configured to increment the counter value after generating the partial digital signature using the private key.

3. The method of claim 1, wherein the secure device is configured to:
   generate a set of private keys and a set of public keys corresponding to the set of private keys, the private key being part of the set of private keys;
   provide the set of public keys to the processing device; and
   maintain the set of private keys internally to the secure device and hidden from the processing device.

4. The method of claim 3, wherein the secure device is configured to generate the set of private keys by:
   generating a seed value;
   configuring a key generation function based on the seed value; and
   after configuring the key generation function based on the seed value, executing the key generation function to generate the set of private keys.

5. The method of claim 3, further comprising:
   prior to transmitting the request to the secure device, generating, by the processing device, a Merkle tree based on the set of public keys; and
   subsequent to receiving the partial digital signature from the secure device:
      determining, by the processing device, a public key corresponding to the counter value from among the set of public keys; and
      constructing, by the processing device, the full digital signature based on the partial digital signature and a pathway through the Merkle tree starting from the public key.

6. The method of claim 5, wherein the Merkle tree includes a root hash, and further comprising:
   providing, by the processing device, the root hash or at least part of the Merkle tree to the secure device for storage in an internal memory of the secure device; and
   removing, by the processing device, the Merkle tree from a memory that is accessible to the processing device.

7. The method of claim 6, further comprising, subsequent to removing the root hash and the Merkle tree from the memory:
   requesting, by the processing device, the root hash and/or the at least part of the Merkle tree from the secure device by incorporating a flag into the request; and
   receiving, by the processing device, the root hash and/or the at least part of the Merkle tree from the secure device as part of a response to the request, the response also including the partial digital signature and the counter value.

8. The method of claim 1, wherein the secure device is a smartcard or a trusted platform module.

9. The method of claim 1, wherein a counter containing the counter value is a pointer that points to a first memory location, and further comprising:
   detecting, by the secure device, an event associated with the counter; and
   in response to detecting the event, updating, by the secure device, the pointer to point to a second memory location that is different than the first memory location.

10. A system comprising:
    a secure device that includes a hardware processor;
    a processing device that is separate from the secure device; and
    a memory communicatively coupled to the processing device, the memory including a software program that is executable by the processing device for causing the processing device to:
    transmit a request to the secure device to obtain a partial digital signature for cryptographically signing data, wherein the secure device is separate from the processing device and configured to generate the partial digital signature using a private key, the private key being generated by the secure device based on a counter value that is maintained internally to the secure device;

receive, from the secure device, the partial digital signature associated with the request;

receive, from the secure device, the counter value corresponding to the private key; and construct a full digital signature, to cryptographically sign the data, based on the partial digital signature and the counter value.

11. The system of claim 10, wherein the secure device is configured to increment the counter value after generating the partial digital signature.

12. The system of claim 10, wherein the secure device is configured to:

generate a set of private keys and a set of public keys corresponding to the set of private keys, the private key being part of the set of private keys;

provide the set of public keys to the processing device; and maintain the set of private keys internally to the secure device and hidden from the processing device.

13. The system of claim 12, wherein the secure device is configured to generate the set of private keys by:

generating a seed value;

configuring a key generation function based on the seed value; and after configuring the key generation function based on the seed value, executing the key generation function to generate the set of private keys.

14. The system of claim 12, wherein the software program is further executable by the processing device for causing the processing device to:

prior to transmitting the request to the secure device, generate a Merkle tree based on the set of public keys; and subsequent to receiving the partial digital signature from the secure device:

determine a public key corresponding to the counter value from among the set of public keys; and construct the full digital signature based on the partial digital signature and a pathway through the Merkle tree starting from the public key.

15. The system of claim 14, wherein the Merkle tree includes a root hash, and wherein the software program is further executable by the processing device for causing the processing device to:

provide the root hash and at least part of the Merkle tree to the secure device for storage in an internal memory of the secure device; and remove the root hash and the Merkle tree from the memory.

16. The system of claim 12, wherein the software program is further executable by the processing device for causing the processing device to:

access a predefined mapping that correlates the set of public keys to a set of index values, each public key in the set of public keys being correlated in the predefined mapping to a respective index value in the set of index values; and determine which public key corresponds to the counter value based on the predefined mapping.

17. The system of claim 10, wherein the secure device is a smartcard or a smart key fob.

18. The system of claim 10, wherein the secure device is a trusted platform module that is internal to a computing device that also includes the processing device.

19. The system of claim 10, wherein a counter containing the counter value is a pointer that points to a first memory location, and wherein the secure device is configured to:

detect an event associated with the counter; and in response to detecting the event, update the pointer to point to a second memory location that is different than the first memory location.

20. A non-transitory computer-readable medium comprising program code that is executable by a processing device for causing the processing device to:

transmit a request to a secure device to obtain a partial digital signature for cryptographically signing data, wherein the secure device is separate from the processing device and configured to generate the partial digital signature using a private key, the private key being generated by the secure device based on a counter value that is maintained internally to the secure device, wherein the secure device includes a hardware processor;

receive, from the secure device, the partial digital signature associated with the request;

receive, from the secure device, the counter value corresponding to the private key; and construct a full digital signature, to cryptographically sign the data, based on the partial digital signature and the counter value.

* * * * *